(12) United States Patent
Dorbeck et al.

(10) Patent No.: US 7,961,427 B2
(45) Date of Patent: Jun. 14, 2011

(54) HIGH PERFORMANCE COMPUTER HARD DISK DRIVE WITH A CARBON OVERCOAT AND METHOD OF IMPROVING HARD DISK PERFORMANCE

(75) Inventors: Mark A. Dorbeck, Brighton, MI (US); Frank Sykora, Caledon (CA); Ali Erdemir, Naperville, IL (US); Osman Eryilmaz, Bolingbrook, IL (US)

(73) Assignee: Galleon International Corporation, Southfield, MI (US)

( * ) Notice: Subject to any disclaimer, the term of this patent is extended or adjusted under 35 U.S.C. 154(b) by 976 days.

(21) Appl. No.: 11/804,979

(22) Filed: May 22, 2007

(65) Prior Publication Data

US 2008/0291570 A1 Nov. 27, 2008

(51) Int. Cl.
*G11B 5/40* (2006.01)
*G11B 5/72* (2006.01)

(52) U.S. Cl. .................. 360/97.03; 360/98.01; 360/122; 360/135

(58) Field of Classification Search ............... 360/97.01, 360/97.02, 98.01, 135, 97.03, 98.07, 122
See application file for complete search history.

(56) References Cited

U.S. PATENT DOCUMENTS

| | | | |
|---|---|---|---|
| 6,466,408 B2 * | 10/2002 | Baumgart et al. | 360/235.7 |
| 6,548,173 B2 | 4/2003 | Erdemir et al. | |
| 6,728,065 B2 * | 4/2004 | Batra et al. | 360/125.03 |
| 2002/0012293 A1 * | 1/2002 | Tsai | 369/13 |
| 2003/0201683 A1 * | 10/2003 | Chen et al. | 310/90 |
| 2004/0021984 A1 * | 2/2004 | Dai et al. | 360/122 |
| 2005/0047001 A1 * | 3/2005 | Logan | 360/97.02 |
| 2005/0135009 A1 * | 6/2005 | Thomas et al. | 360/133 |
| 2005/0217353 A1 * | 10/2005 | Ishiyama | 73/104 |
| 2005/0264926 A1 * | 12/2005 | Burts-Cooper et al. | 360/97.02 |
| 2005/0264938 A1 * | 12/2005 | Yasui et al. | 360/235.2 |
| 2005/0271902 A1 | 12/2005 | Nakamura et al. | |
| 2006/0023354 A1 | 2/2006 | Stipe | |

OTHER PUBLICATIONS

Patent Cooperation Treaty, International Preliminary Report on Patentability for the corresponding PCT/US2008/04044 mailed Mar. 24, 2010.

* cited by examiner

*Primary Examiner* — Jefferson Evans
(74) *Attorney, Agent, or Firm* — Brooks Kushman P.C.

(57) ABSTRACT

A high performance hard disk drive is disclosed in which a flying read/write head runs in contact or in near contact with a rotating platter. In this design there is no wear of the hard disk platter or flying head due to both head and platter being coated with an amorphous carbon that has an exceptionally low coefficient of friction in a sealed, inert gas environment. The overcoat contains carbon in the range between about 52 and 80 atomic percent and hydrogen in the range between about 20 to 48 atomic percent. There is no lubricant required in this design, which eliminates a significant cause of hard drive failure from oxidation of the lubricant, stiction and rippling of the lubricant. This contact method achieves a high areal density with no wear, within a robust, hermetically sealed environment.

20 Claims, 3 Drawing Sheets

HIGH PERFORMANCE COMPUTER HARD DISK DRIVE WITH A CARBON OVERCOAT AND METHOD OF IMPROVING HARD DISK PERFORMANCE

FIELD OF THE INVENTION

This invention relates to computer storage devices and more particularly to a high performance hard disk drive and method.

BACKGROUND OF THE INVENTION

A hard disk drive stores digitally encoded data on circular plates, called platters. The platters are mounted on a spindle and rotate in unison at high speeds past read-write heads. The heads fly on sliders in close proximity to magnetic layers on the platters. Sensors write (record) and read (retrieve) the digitized data which is stored on the magnetic layers. The magnetic layers are protected with a thin carbon overcoat.

Disk drives are mounted in sealed housings to protect them against dust, humidity, and other contaminants. The flying heads are supported on cushions of air only nanometers (flying height) above the platters. The platters must be free of contaminants and imperfections to maintain an extremely close spacing (flying height) between the heads and platters. Modern hard drives have flying head heights of about 5 to 15 nanometers.

Head impacts [crashes] with platters, caused by power losses or low pressure at altitudes normally above 10,000 ft., can be catastrophic because important records can be permanently lost. Consequently, time consuming back-up records are frequently made to protect data, thus increasing the cost of doing business. Making back-up records is an inefficient use of valuable technical personnel. Crashes also result in expensive drive replacements.

Pressure, temperature and humidity affect the operation of a hard disk drive. If air pressure in a drive is too high, data will be improperly written and read. Air pressure is affected by temperature. Operating conditions in current drives are so critical that temperature compensation is provided to accommodate changes in the environment. Humidity over extended periods accelerates component corrosion. Corrosion of the magnetic layer is adversely affected if the carbon overcoat is not dense or thick enough to provide full coverage. When heads are parked for long periods of time, stiction can lead to hard drive failure and lost data. Stiction can occur especially if a hard drive has been out of use for an extended period. When the drive is powered up, the flying head can stick to the disk lubricant layer, potentially preventing the disk from rotating.

Wear, corrosion, manufacturing defects and head crashes are the major causes of hard drive failures. When crashes occur, heads scrape and damage platters. The current strategy is to prevent head contact on the data portions of platters. Impacts and contacts can occur during power down and power failures. Hard disk drive manufacturers have taken several actions to address these problems and thus extend drive life.

One action is to incorporate data free landing zones ("LZ") usually near inner diameters of platters that heads contact during power down. The landing zones prevent head contact with data storage areas during start up and power down. Landing zones reduce storage space, increase cost and make mechanical tolerance control more difficult.

In newer drives, springs and the inertia of the rotating platters park flying heads in landing zones during unexpected power losses. Other technologies that are used include laser zone texturing ("LZT") and head unloading ("HUT"). In laser zone texturing, stiction and wear are reduced by incorporating in landing zones, an array of smooth laser generated nanometer-scale "bumps". In head unloading, during parking, heads are lifted off platters onto plastic "ramps" near outer edges of the platters, thus reducing shock forces and eliminating stiction during start up and powering down. Both technologies increase the cost, complexity and difficulty of manufacturing hard drives.

Competitive market pressures and software requirements have forced hard disk manufacturers to pursue increased drive capacities and reduced seek times (data rates). Drive capacity, typically designated in gigabits per square inch, is dependent on the areal density of the disk. Reduced seek times require friction reduction and increased rotational speed. Rotational speed is closely related to the lubricant on platters and lubricant is one of the factors that limit rotational speed. Imperfections, such as drive motor spindle bearing, out of roundness and runout, have limited increases in areal density and reduction of seek times. Manufacturers have reduced seek times by incorporating fluid dynamic bearings. Inasmuch as fluid bearings have no metal-to-metal contact, they do not affect disk loading and can handle higher disk rotational speeds.

For areal densities and data rates to increase, incidental crashes of flying heads must be prevented. Platter surfaces must be very smooth and defect free. For increases in areal density, the carbon overcoat that protects the magnetic data recording layer must be thinner however, a thinner overcoat may expose the magnetic layer to corrosion because of pin holes. Areal density can be increased by reducing the spacing between the recording transducer, or read/write head, and the magnetic layer of the magnetic recording disk. The magnetic spacing is the effective distance between the magnetic recording head and the magnetic media layer on the disk. The magnetic spacing consists of the flying height of the head, recession of the head pole tip, thickness of the carbon (DLC) film on the head and the thickness of the carbon and lubricant overcoats on the disk surface.

Vijayen, U.S. Pat. No. 6,537,668 discloses a diamond like carbon material for magnetic recoding media containing an amorphous carbon comprising carbon in the range between about 72 and 92 atomic percent and hydrogen in the range between about 8 and 18 atomic percent.

FIG. 2, a schematic of a current hard disk drive, shows the relationship between a flying head and a platter for an areal density, also referred to as storage density, of approximately 100 Gb/in$^2$. A disk drive housing 100 encloses the platters and flying heads. A flying head consists of a slider 101 and a magnetic element 102, with carbon overcoat 103, typically 3 to 5 nm thick. The flying height 104 is the physical distance that separates the flying head and surface of the platter. The flying height ranges from 5 nm to 15 nm to achieve approximately 100 Gb/in$^2$.

The hard disk substrate 108 of the platter, which may be fabricated from any number of materials, has a magnetic recording layer 107 that is protected with a carbon overcoat 106. In current drives the carbon overcoat 106 ranges from about 3 nm to 5 nm. A perflouropolyether (PFPE) lubricant film 105 is deposited on the carbon overcoat 106. The combination of the lubricant 105 and carbon overcoat 106 protects the magnetic data recording layer 107 from corrosion and mechanical damage from incidental contact with the recording head.

SUMMARY OF THE INVENTION

This invention is an improvement of pending application Ser. No. 10/969,667, filed on May 16, 2005 which is incorporated by reference. Application Ser. No. 10/969,667 is directed to the application of a near frictionless and ultra low wear structurally amorphous carbon coating to computer drives which is disclosed in U.S. Pat. No. 6,548,173 that is fully incorporated herein by reference. A characterizing feature of the incorporated by reference amorphous coating is that it comprises carbon in the range between about 52 and 80 atomic percent and hydrogen in the range between about 20 and 48 atomic percent.

The primary objects of this invention are to improve the durability, increase the storage capacity and reduce the seek times of a hard disk drive. These objects are achieved by one or more of the following actions: (1) increasing the areal density of the data recording magnetic coating of a platter; (2) reducing the (magnetic spacing) operating gap between a head and platter; (3) eliminating landing zones, and (4) coating the head and platter with the "near frictionless" or similar coating of U.S. Pat. No. 6,548,173; and (5) mounting the drive in a sealed housing filled with an inert gas. These modifications further eliminate head crashes, eliminate corrosion, eliminate stiction, reduce cost and improve reliability. Costs are further reduced and reliability improved by eliminating head unloading technology ("HUT") and laser texturing ("LT") technology. As used herein, the term hard disk drive is intended to include optical and magnetic disk drives.

In a first aspect of the invention, the areal density of a hard disk drive is increased and the seek times reduced by replacing the coatings on hard disk platters with an ultra low friction and ultra low wear structurally amorphous carbon coating in an inert gas environment. There is no lubricant layer on the disk and the flying height is reduced to 0 nm (full contact) to 5.0 nm. In a like manner, mating bearing components in the hard disk drive spindle motor benefit from application of this ultra low friction and ultra low wear structurally amorphous carbon coating in an inert gas environment. Specifically, the bearing shaft and bushing or sleeve of the spindle motor are coated with the ultra-low friction amorphous carbon coating.

FIG. 4 is a cross-sectional view of a hard drive bearing assembly. showing a bearing sleeve 401 and bearing shaft 400 coated with the NFC overcoat; 402 is the bearing seal, 403 are the hard disk platters, 404 is the drive base and 405 is the bearing housing.

In a second aspect of the invention, hard disk drive capacity is increased and costs are reduced by eliminating landing zones, head unloading ("HUT") and laser texturing" ("LT") technology.

In a third aspect of the invention, the volume of storage media is substantially reduced by virtue of achieving disk storage on the order of terabits/in$^2$. The multiplicity of disks in larger hard drives and servers can be reduced, as well as the complexity thereof.

In employing the teaching of the present invention, a plurality of alternate constructions can be provided to achieve the desired results and capabilities. In this disclosure, only several embodiments are presented for the purpose of disclosing our invention. However, these embodiments are intended as examples only and should not be considered as limiting the scope of our invention.

The foregoing features, benefits, objects and best mode of practicing the invention as well as additional benefits and objects will become apparent from the ensuing detailed description of a preferred embodiment and the subject matter in which exclusive property rights are claimed is set forth in the numbered claims which are appended to the detailed description of the preferred embodiment.

Further features and benefits will become apparent by reference to the drawings and ensuing detailed description of a preferred embodiment which discloses the best mode contemplated in carrying out the invention. The exclusive rights which are claimed are set forth in each of the numbered claims following the detailed description of the preferred embodiment.

BRIEF DESCRIPTION OF THE DRAWINGS

The invention will be better understood and further objects, characterizing features, details and advantages thereof will appear more clearly with reference to the diagrammatic drawings illustrating specific embodiments of the invention by way of non-limiting example only.

DETAILED DESCRIPTION OF A PREFERRED EMBODIMENT

Figure 1:
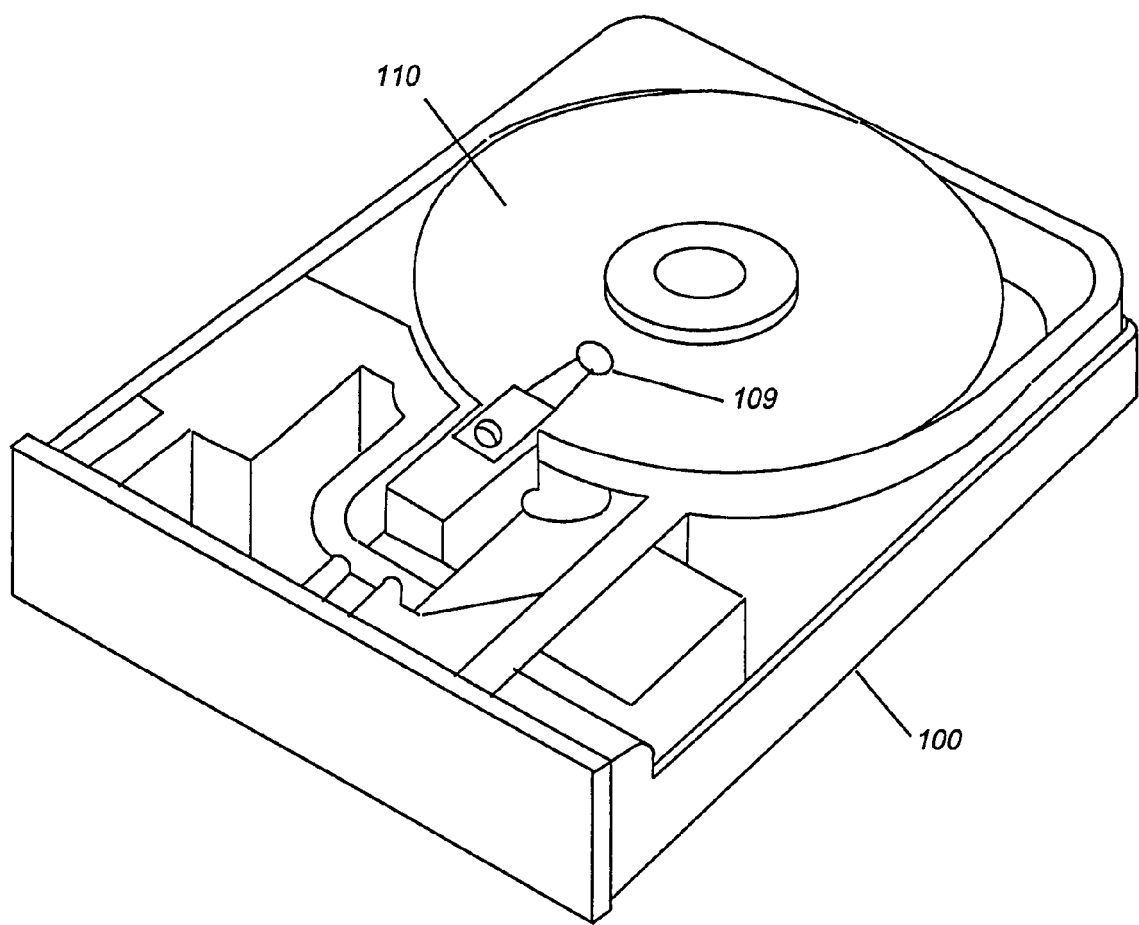
FIG. 1 is a perspective view of a typical hard disk drive.
Figure 2:
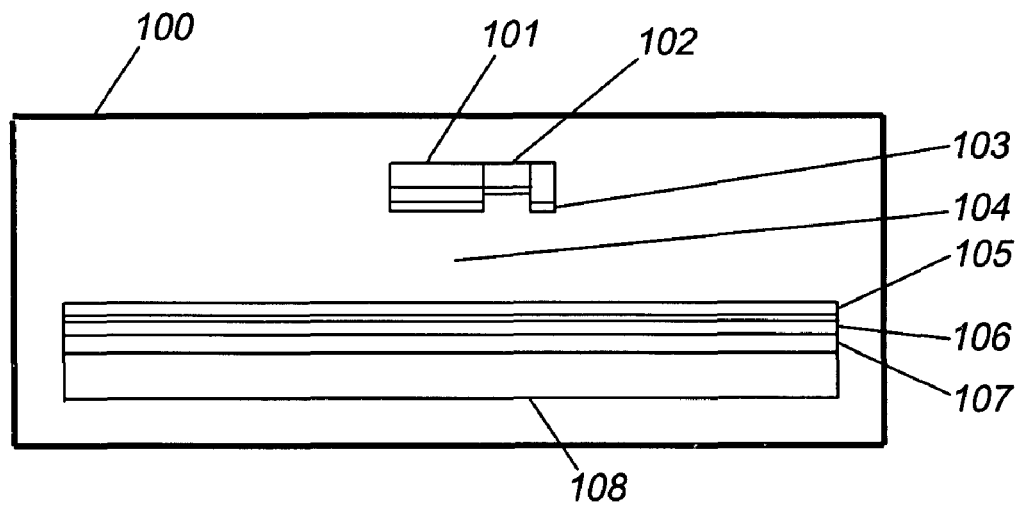
FIG. 2 is a cross-sectional view showing head-platter spacing in current drives

Referring now to the drawings wherein like numerals designate like and corresponding parts throughout the several views, as shown in FIG. 1, a hard disk drive consists of a housing 100 containing circular platters 110 which rotate in unison at high speeds past read-write heads 109. The heads 109 are supported on cushions of air above the platters 110. They write (record) digitized data on thin magnetic coatings that is read (retrieved) by sensors on the read-write heads 109.

The signal to noise ratio in a drive is proportional to the number of magnetic particles per bit to the one-half power, and progressively smaller grains with a higher disk coercivity are required for increases of areal density in every generation of disk drive. The spacing laws require a progressively decreasing magnetic spacing between a head and platter as areal density increases. This involves both reduced head flying heights as well as thinner protective coatings. In at least one embodiment of the present invention, the magnetic spacing is less than 6.5 nm.

There are two main challenges to making reliable contact recording interfaces (i) platter and recording head wear, particularly if head contact occurs and (ii) friction induced recording head bounce. Current sliders are carefully pre-loaded to optimize sliding contact forces. The stiff air bearing used with conventional flying sliders will result in excessive contact forces in the event head contacts occur. A weaker air bearing, with less pre-load, produces an undesirable amount of bounce.

Sliding contacts of heads with platters are advantageous from the standpoint of reducing the bit error rate ("BER"), and dramatically increasing areal density which is currently expressed in gigabits per square inch. In contact recording, smooth sliding of a recording head over a platter is the key factor in achieving the best possible recording performance. Bounce at the trailing edge of a slider is negatively impacted by the presence of a lubricant that tends to accumulate around the contacting asperities at the head-platter interface.

Control of the normal contact force that is applied to the recording head determines the rate of wear for both a sliding head and platter and it is the frictional characteristic of this interaction that limits the performance of contact recording over a length of time.

In current drives, a recording density (i.e. areal density) of 1 terabit per square inch, requires a head flying height of about zero (full contact) to 5 nm. The head-platter interface must be extremely smooth and the RMS values of opposing surfaces on the order of only a few angstroms. At this low range of flying height, the super-smooth interfaces have strong attractive forces that cause head-platter interface crashes. The intermolecular attractive forces on the mating super-smooth head-platter surfaces prevent increasing recording density (areal density) in this manner.

Head crashes, in fact, increase as the surface finishes of the head and platter become smoother, due to kinetic friction at the interface. Start-up and power down pressures rise as the RMS roughness decreases. The resistance factor, whether on lubricated or non-lubricated media, is characterized as stiction. Stiction is primarily the result of the PFPE (perfluoropolyether) lubricant that is typically applied on traditional carbon overcoats to a thickness of 1-3 nm, more or less. This thin layer of lubricant is still subject to forming ripples, pools and other forms of redistribution. The slider/flying head is subject to stiction as it interferes with the lubricant anomalies. Elimination of the lubricant at the bearing surfaces and on the disk, precludes this condition. The need for ultra-low friction and wear coatings for disk drives has been recognized, but as yet, none have been available.

U.S. Pat. No. 6,548,173, incorporated herein by reference, discloses an ultra-low friction (sometimes referred to herein as a near frictionless carbon "NFC" coating), corrosion resistant and ultra-low wear amorphous carbon diamond-like coating. Diamond, diamond-like and amorphous carbon coatings are known in the art for resisting mechanical wear, abrasion and chemical corrosion. Although they are very hard and abrasion resistant most of them exhibit high frictional characteristics especially in dry, inert environments (in the absence of humidity and oxygen). When used under sliding wear conditions, they produce high frictional losses and severe wear on mating surfaces.

Figure 5:
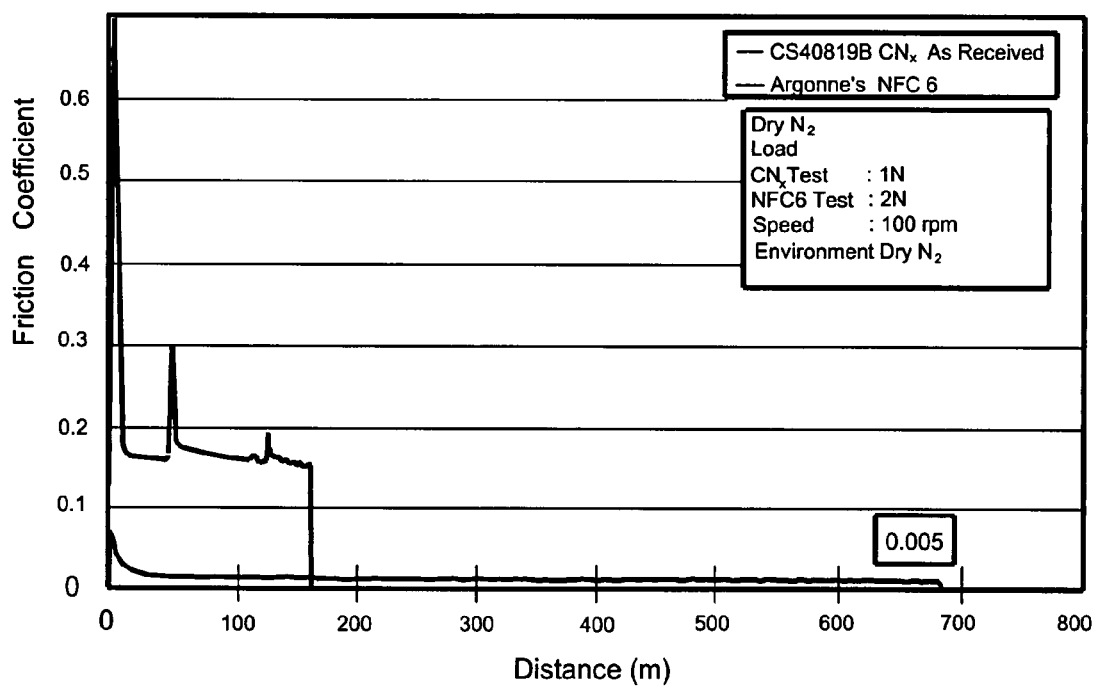
FIG. 5 is a graph of friction characteristics of $CN_x$ vs NFC amorphous carbon overcoat on hard disk platters in a dry nitrogen environment.

FIG. 5 is a graph developed from tests at the Argonne National Laboratory of friction characteristics of $CN_x$ vs NFC amorphous carbon overcoat on hard disk platters in a dry nitrogen environment (humidity and oxygen are not present, or very minimal). A typical DLC overcoat yields a 0.17 friction coefficient while the NFC overcoat yields 0.005. The test is representative only and was not conducted under actual operating conditions.

The amorphous carbon and diamond-like coating in U.S. Pat. No. 6,548,173, which replaces the current protective platter coatings is extremely smooth and hard, is nearly frictionless without lubricant in an inert gas environment and has a high resistance to corrosion. The absence of lubricant eliminates errors caused by a build-up of lubricant around the sliding and flying head, a major cause of head crashes. In an inert gas environment, positive hydrogen ions on opposing head and platter surfaces produce opposing intermolecular forces which prevent rather than cause stiction.

Friction tests in an inert gas atmosphere show that the coefficient of friction of the U.S. Pat. No. 6,548,173 coating is within a range of 0.001 to 0.007. The lower value is about 20 to 100 times less than a teflon or polished fine grain diamond coating. Head contact recordings with other known coatings for short periods caused head crashes and catastrophic failures of hard disk drives with loss of data.

The low coefficient of friction inherent in the U.S. Pat. No. 6,548,173 coating that is applied to both head and disk in the present invention provides ultra-low friction at the head-disk interface. The inert gas, such as nitrogen or argon in the hermetically sealed housing, sustains the low friction in an atmosphere that is void of oxygen and moisture and prevents corrosion of drive components.

Figure 3:
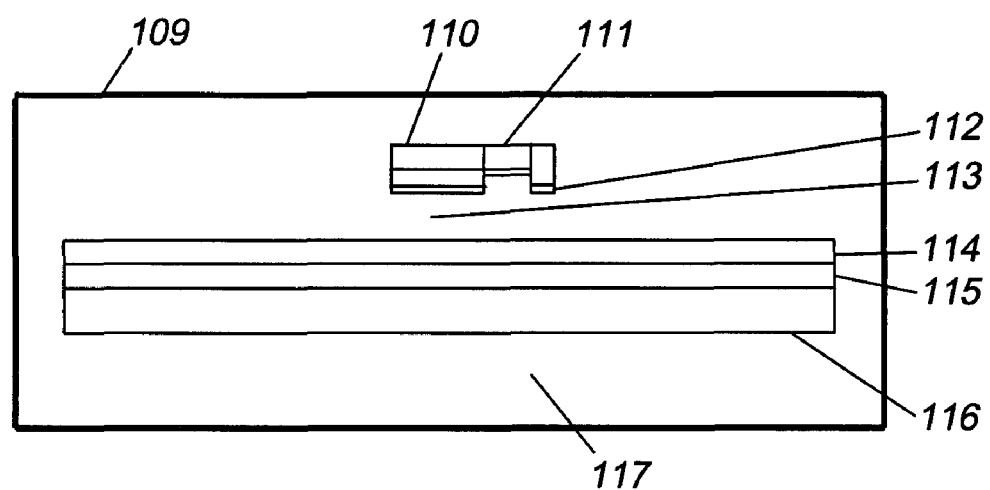
FIG. 3 is a cross-sectional view showing head-platter spacing according to our invention.
Figure 4:
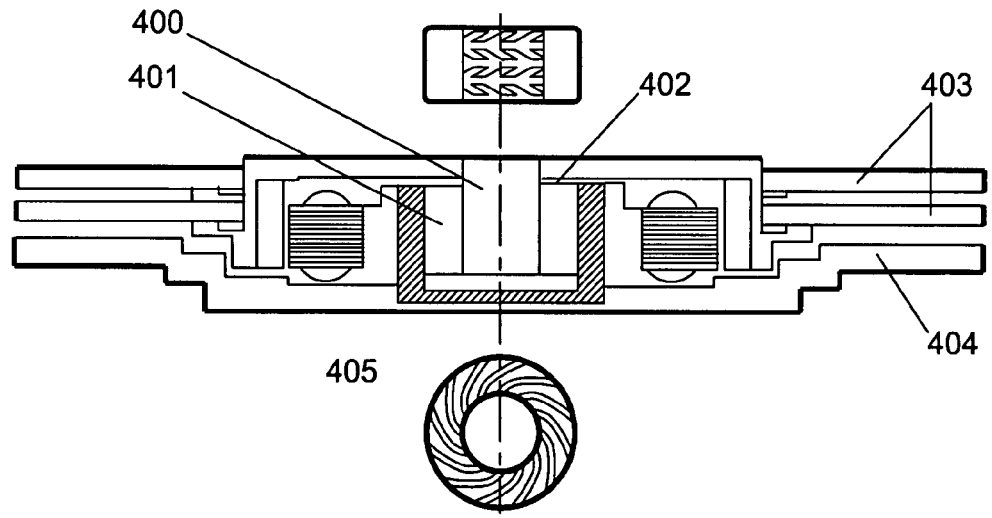
FIG. 4 is a cross-sectional view of a hard drive bearing assembly.

The present invention modifies the typical relationship between a flying head and a hard disk by decreasing the flying height to achieve an areal density that is greater than 1 Tb/in 2, a substantial increase over current storage capability. In this embodiment described in FIG. 3, the hard drive case 109 is permanently sealed and infused with an inert gas 117. The flying head, comprised of a slider 110 and a magnetic element 111, are coated with a highly hydrogenated carbon overcoat 112 with thickness ranging from 0.3 nm to 5.0 nm. The flying height 113 is reduced to 0 nm (full contact) to 5.0 nm which increases the areal density by an order of magnitude over currently achievable design capacities. In at least one embodiment of the present invention, the flying head runs in contact with the platter. The hard disk substrate 116 may be fabricated from any of a number of materials with any commonly used magnetic recording layer 115 and subsequently overcoated with the proposed highly hydrogenated carbon coating 114. The carbon coating 114 in this regime is from 0.5 nm to 5.0 nm thick. There is no lubricant used in this embodiment.

In a first embodiment of the invention, a hard disk drive is mounted in a hermetically sealed housing filled with an inert gas, such as nitrogen or argon. The areal density of the data recording magnetic coatings of the platters is increased; the overlying coatings and lubricant are replaced with the thin ultra low friction, ultra low wear structurally amorphous carbon coating of U.S. Pat. No. 6,548,173; and the flying height of the heads is within a range of 0 nm (full contact) to 5.0 nm flying height.

In a second embodiment, a hard disk drive is comprised of the described features of the first embodiment features and additionally, the landing zones, laser zone texturing ("LZT") and head unloading ("HUT") features have been eliminated.

From the above it will be understood that our invention provides numerous important benefits over the prior art. One benefit is that the storage capacity of a hard drive has been increased. Another benefit is that the hard disk seek time has been reduced. Another benefit is that hard disk drive crashes have been reduced. Another benefit is that hard drive component corrosion has been eliminated. Another benefit is that hard disk drive costs have been reduced.

Although only two embodiments of our invention have been described, it is not our intention to limit our invention to these embodiments since other embodiments can be developed by persons skilled in the art by obvious changes such as substitutions of materials without departing from the spirit thereof.

What we claim is new is:

1. In a computer hard disk drive of the type having a plurality of platters and heads for recording and retrieving digitally encoded data, the improvement comprising: said heads having a flying height within a range of 0 nm (full contact) to 5 nm and a magnetic spacing between said platters and said heads is less than 6.5 nm; said platters having carbon overcoats containing carbon in a range of about between 52 to 80 atomic percent and hydrogen in a range of about between 20 to 48 atomic percent; and wherein said overcoats of said platters do not include any lubricant disposed thereon.

2. The improvement recited in claim 1 wherein said heads have overcoats grown from a plasma that contains about 25-95% hydrogen and about 75-5% of a carbon containing source.

3. The improvement recited in claim 2 wherein said overcoats on the heads are near frictionless, ultra low wear structurally amorphous carbon with a thickness of about 0.3 to 5 nm.

4. The improvement recited in claim 1 wherein said overcoat is a near frictionless, ultra low wear structurally amorphous carbon overcoat on said platters and has a thickness of 0.5 to 5 nm.

5. The improvement recited in claim 1 where each of said platters has a magnetic layer with areal density greater than 1 Tb/in$^2$.

6. The improvement recited in claim 1 further comprising an inert gas atmosphere in the interior of said drive.

7. The improvement recited in claim 6 wherein said inert gas atmosphere is a mixture of hydrogen and nitrogen gas.

8. The improvement recited in claim 1 wherein the heads run in contact with the platters.

9. A high performance hard disk drive for recording and retrieving digitally encoded data comprising: a hermetically sealed housing; a bearing spindle and sleeve; a plurality of platters mounted for rotation with said spindle in said housing; a plurality of heads adjacent to said platters for recording and retrieving digitally encoded data from said platters; each of said heads having a flying height from 0 nm (full contact) to less than 5 nm; and a structurally amorphous carbon overcoat on each of said heads and platters, the overcoat containing carbon in the range between about 52 and 80 atomic percent and hydrogen in the range between about 20 to 48 atomic percent; wherein a magnetic spacing between said platters and said heads is less than 6.5 nm.

10. The high performance hard disk drive recited in claim 9 further comprising a 0.5 to 3 μm thick structurally amorphous carbon overcoat on said bearing spindle and sleeve.

11. The high performance hard disk drive recited in claim 9 wherein the overcoat is an ultra-low wear structurally amorphous carbon coating which imparts positive charges on opposing coated surfaces that repel each other during drive operation.

12. The high performance hard disk drive recited in claim 9 further comprising a magnetic layer on said platter having an areal density that is greater than 1 Tb/in$^2$.

13. The high performance hard disk drive recited in claim 9 wherein the heads run in contact with the platters.

14. The high performance hard disk drive recited in claim 9 wherein the platters are provided without having any lubricant disposed thereon.

15. A method for improving the performance of a hard disk drive comprising the steps of applying an ultra low friction, ultra low wear, structurally amorphous carbon overcoat containing carbon in the range between about 52 and 80 atomic percent and hydrogen in the range between about 20 to 48 atomic percent to the surfaces of platters and heads of said drive; providing an inert gas atmosphere in the interior of said drive; reducing the flying height of said heads to 0 nm (full contact) to 5 nm; and applying said ultra low friction, ultra low wear, structurally amorphous carbon overcoat to a spindle and sleeve on which said platters are mounted for rotation.

16. The method for improving the performance of a hard disk drive recited in claim 15 wherein said platters do not include parking zones for said heads.

17. The method for improving the performance of a hard disk drive recited in claim 15 wherein said platters do not include laser texturing.

18. The method for improving the performance of a hard disk drive recited in claim 15 wherein said overcoats of said platters do not include lubricants.

19. The method for improving the performance of a hard disk drive recited in claim 15 further comprising the step of increasing the areal densities of magnetic layers of said platters to greater than 1 Tb/in$^2$.

20. A high performance hard disk drive for recording and retrieving digitally encoded data comprising: a housing; a bearing spindle and sleeve; at least one platter mounted for rotation with said spindle in said housing; at least one head adjacent to said platter for recording and retrieving digitally encoded data from said platter, said head having a flying height from 0 nm (full contact) to less than 5 nm; and a structurally amorphous carbon overcoat on each of said bearing spindle and sleeve, the overcoat containing carbon in the range between 52 and 80 atomic percent and hydrogen in the range between 20 to 48 atomic percent; wherein a magnetic spacing between said platter and said head is less than 6.5 nm.

* * * * *

UNITED STATES PATENT AND TRADEMARK OFFICE
CERTIFICATE OF CORRECTION

| | | |
|---|---|---|
| PATENT NO. | : 7,961,427 B2 | Page 1 of 1 |
| APPLICATION NO. | : 11/804979 | |
| DATED | : June 14, 2011 | |
| INVENTOR(S) | : Mark A. Dorbeck et al. | |

It is certified that error appears in the above-identified patent and that said Letters Patent is hereby corrected as shown below:

On the Title Page

Item (73) Assignee:

Add -- UCHICAGO ARGONNE, LLC
　　　　Chicago, IL --.

Signed and Sealed this
Twentieth Day of March, 2012

David J. Kappos
*Director of the United States Patent and Trademark Office*